(No Model.) 2 Sheets—Sheet 1.
G. W. NÜTZ.
DENTAL ENGINE.
No. 454,659. Patented June 23, 1891.
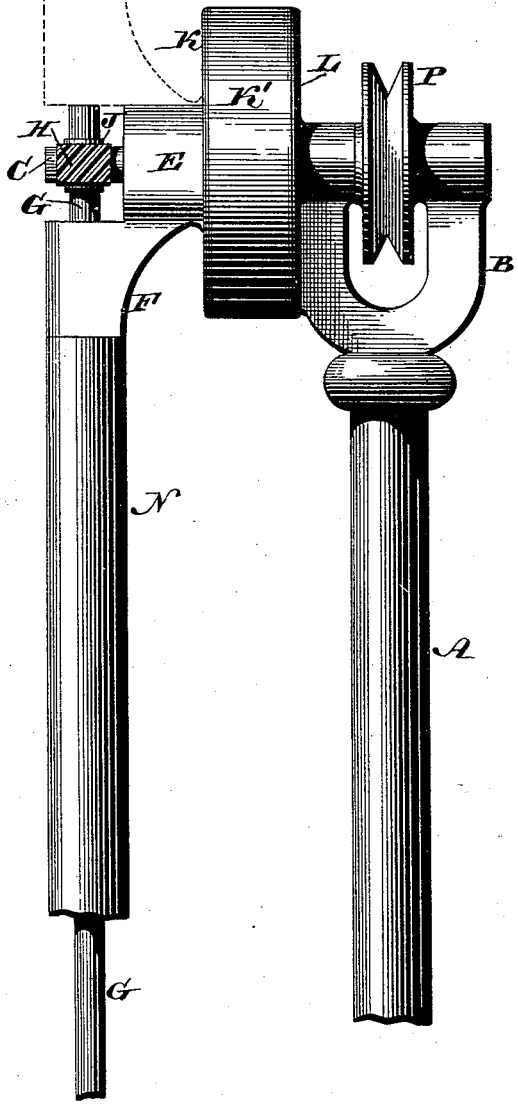
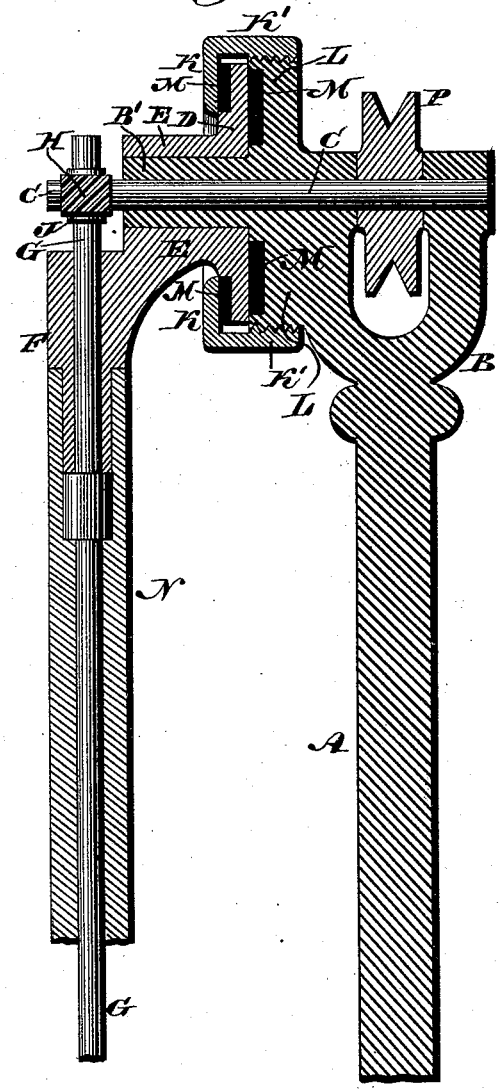
WITNESSES:
Robt Aitow
Wm C. Widersheim
INVENTOR
George W. Nütz
BY Joshua Biederman
ATTORNEY.

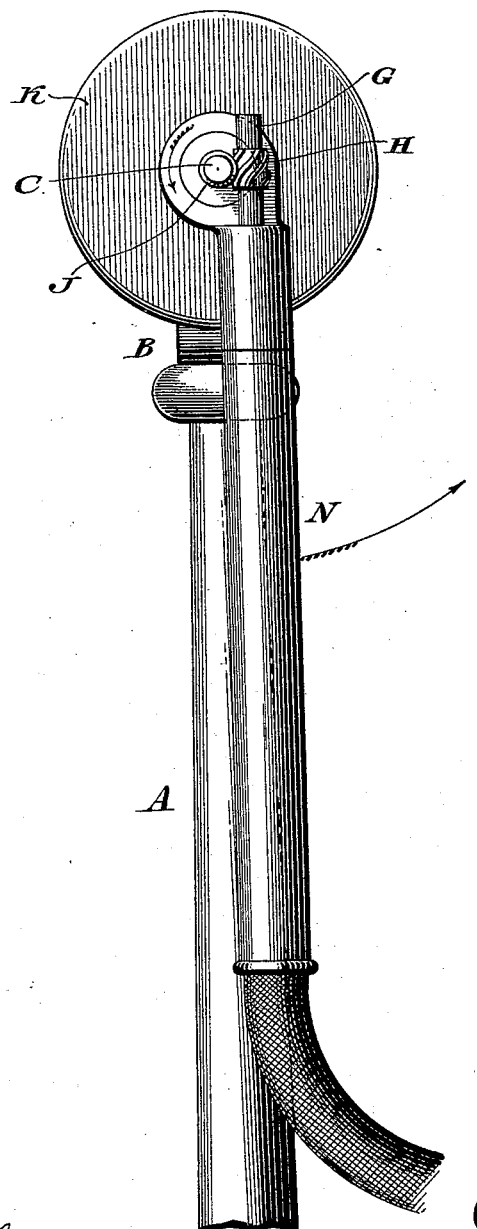

UNITED STATES PATENT OFFICE.

GEORGE W. NÜTZ, OF PHILADELPHIA, PENNSYLVANIA, ASSIGNOR TO HENRY D. JUSTI, OF SAME PLACE.

DENTAL ENGINE.

SPECIFICATION forming part of Letters Patent No. 454,659, dated June 23, 1891.

Application filed September 18, 1890. Serial No. 365,382. (No model.)

*To all whom it may concern:*

Be it known that I, GEORGE W. NÜTZ, a citizen of the United States, residing in the city and county of Philadelphia, State of Pennsylvania, have invented a new and useful Improvement in Dental Engines, which improvement is fully set forth in the following specification and accompanying drawings.

My invention relates to improvements in dental engines; and it consists, first, of a friction-joint interposed between the bearing of the shafts of the engine, and, second, of the combination of parts hereinafter set forth.

Figure 1 represents a side view of a portion of a dental engine embodying my invention. Fig. 2 represents a vertical section of the same. Fig. 3 represents a view thereof at a right angle to Fig. 1.

Similar letters of reference indicate corresponding parts in the several figures.

Referring to the drawings, A designates a standard, in the head B of which is journaled the shaft C. On a laterally-projecting portion B' of the said head is mounted the friction-disk D, having a sleeve E, provided with a downwardly-projecting boss or collar F, the latter furnishing a bearing for a shaft G, which is at right angles to the shaft C. The said shaft C is provided with a worm-wheel H, gearing with a worm-wheel J on the shaft G, so that rotary motion may be imparted from the shaft C to the shaft G.

To prevent the turning of the friction-disk D on the head B the collar K is employed, the said collar consisting of an annulus with a flanged rim K', said annulus engaging the side of the disk and having an internal screw-thread adapted to engage the periphery of a flanged portion L of the head and thereby tighten the disk against the said head. Between the disk and the head and in recessed portions of the same are the packings or gaskets M of rubber or other suitable material. To the outer end of the downwardly-projecting boss F is secured an arm N in such manner as to securely assemble the parts and provide for dismemberment of the same, and to also provide additional bearing-surface for the shaft G, which latter carries the cable connected with the tool of the engine. A suitable pulley P on the shaft C is employed to rotate the same.

It will be seen that by the mechanism herein described the arm N, with its shaft G, may be turned to any angle desired and retain the adjustment in position owing to the friction-joint between the bearings of the two shafts. It will also be seen that by moving the flanged rim or sleeve K' so as to vary the degree of compression of the packing the frictional contact of the disks may be adjusted, whereby more or less power is required to operate the joint.

Having thus described my invention, what I claim as new, and desire to secure by Letters Patent, is—

1. A dental engine having a standard, a friction-disk mounted on the head of the standard, and a collar with flanged rim, said parts being combined substantially as described.

2. In a dental engine, the combination of a standard provided with a laterally-projecting head having a flanged portion, a shaft rotatable on the head of said standard, a friction-disk rotatable on said head and having its side bearing against a flanged portion thereof, and a collar with a rim for clamping said disk to said head, substantially as and for the purpose described.

3. The combination of a standard having a head, a rotatable shaft journaled in said head, a friction-disk rotatable on said head and having a downwardly-projecting boss, a collar with flanged rim for clamping said disk and head, a shaft rotatable in said projecting boss, and mechanism for operating said shafts, substantially as and for the purpose described.

4. The combination of a standard having an extended head, a friction-disk rotatable on said head and having one of its sides bearing against a flanged portion of said head, said disk provided with a boss connected with and projecting from said disk, shafts journaled in said head and boss, mechanism, substantially as described, for rotating the said shafts, a clamping-collar for the disk and head, and gaskets between said disk and head, substantially as and for the purpose described.

5. The combination of a standard provided with a laterally-extended head, a disk rotatable on said head and having a projecting boss, shafts journaled in said head and boss and provided with operating mechanism, a collar provided with a flange and clamping said disk and head, and an arm secured to said boss, whereby additional bearing is provided for the shaft passing through the boss, substantially as described.

6. In a dental engine, a standard with a head having a laterally-projecting portion with a flange thereon, a disk having a sleeve with a projecting boss or collar having an arm thereon, and shafts adapted to rotate in said head and arm, said parts being combined substantially as described.

7. A friction-joint interposed between the shafts of a dental engine, permitting the rotation and consequent angular adjustment of the tool-supporting arm, and the consequent retention of the same in the adjusted position, substantially as described.

8. In a dental engine, a two-part shaft with a frictional joint between the same, consisting of disks with interposed packing, and a sleeve which connects said disks and is adapted to adjust the friction of the joint, substantially as described.

GEORGE W. NÜTZ.

Witnesses:
JOHN A. WIEDERSHEIM,
WM. C. WIEDERSHEIM.